US012179050B2

(12) United States Patent
Macomber

(10) Patent No.: US 12,179,050 B2
(45) **Date of Patent: *Dec. 31, 2024**

(54) FIRE SPRINKLER WITH ACTUATOR

(71) Applicant: Tyco Fire Products LP, Cranston, RI (US)

(72) Inventor: Scott Thomas Macomber, Johnston, RI (US)

(73) Assignee: Tyco Fire Products LP, Cranston, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/228,876

(22) Filed: Aug. 1, 2023

(65) Prior Publication Data

US 2023/0372756 A1 Nov. 23, 2023

Related U.S. Application Data

(63) Continuation of application No. 17/579,078, filed on Jan. 19, 2022, now Pat. No. 11,766,581, which is a (Continued)

(51) Int. Cl.

*A62C 37/10* (2006.01)
*A62C 37/40* (2006.01)

(Continued)

(52) U.S. Cl.

CPC .............. *A62C 37/10* (2013.01); *A62C 37/40* (2013.01); *A62C 37/46* (2013.01); *A62C 3/002* (2013.01)

(58) Field of Classification Search

CPC ......... A62C 37/10; A62C 37/08; A62C 37/11; A62C 37/14; A62C 31/02; A62C 37/40;

(Continued)

(56) References Cited

U.S. PATENT DOCUMENTS 2,129,012 A * 9/1938 Lewis .................... A62C 37/12 169/39
4,757,865 A * 7/1988 Simons .................. A62C 37/12 169/42

(Continued)

FOREIGN PATENT DOCUMENTS

WO WO-96/28218 A1 9/1996
WO WO-2015/191619 A1 12/2015

OTHER PUBLICATIONS

International Search Report and Written Opinion for International Application No. PCT/US2017/037255, mail date Jul. 27, 2017, 14 pages.

*Primary Examiner* — Joseph A Greenlund
*Assistant Examiner* — Juan C Barrera
(74) *Attorney, Agent, or Firm* — Foley & Lardner LLP

(57) ABSTRACT

A sprinkler includes a frame, a deflector member, a sealing assembly, and a releasing mechanism for a controlled actuation. The releasing mechanism includes a hook member, a strut member, a load member, a link member, and an actuator. The link member surrounds or frames the strut and hook members and holds the members in a static relationship of an unactuated configuration. A preferred link member includes a single central slot through which each of the hook member and the strut member extend. The actuator is arranged with respect to the link member to separate the hook and strut members and break the link member upon operation of the actuator.

20 Claims, 6 Drawing Sheets

Related U.S. Application Data continuation of application No. 16/309,175, filed as application No. PCT/US2017/037255 on Jun. 13, 2017, now Pat. No. 11,291,873.

(60) Provisional application No. 62/349,576, filed on Jun. 13, 2016.

(51) Int. Cl.
*A62C 37/46* (2006.01)
*A62C 3/00* (2006.01)

(58) Field of Classification Search
CPC ......... A62C 37/46; A62C 3/002; A62C 37/12; A62C 35/68; A62C 3/0292; A62C 35/60; B05B 1/265; F16K 13/04; Y10T 137/1632; Y10T 137/1767
USPC .................................. 169/39, 37, 40, 41, 42
See application file for complete search history.

(56) References Cited

U.S. PATENT DOCUMENTS

| | | | | |
|---|---|---|---|---|
| 2002/0036090 | A1 | 3/2002 | Gil | |
| 2006/0060361 | A1 * | 3/2006 | Pounder ................ | A62C 37/14 169/37 |
| 2010/0059235 | A1 | 3/2010 | Feenstra | |
| 2010/0132962 | A1 | 6/2010 | Silva et al. | |

* cited by examiner

FIRE SPRINKLER WITH ACTUATOR

CROSS-REFERENCE TO RELATED APPLICATIONS

The present application is a continuation of U.S. patent application Ser. No. 17/579,078, filed Jan. 19, 2022, which is a continuation of U.S. patent application Ser. No. 16/309,175, filed Dec. 12, 2018, which is a national stage of PCT Patent Application No. PCT/US2017/037255 filed on Jun. 13, 2017, which claimed the benefit of priority to U.S. Provisional Application No. 62/349,576 filed on Jun. 13, 2016, the disclosures of which are incorporated herein by reference in their entireties.

BACKGROUND OF INVENTION

PCT Patent Publication WO2015/191619 A1 is directed to controlled systems and methods for storage fire protection. Shown at FIGS. 7, 7A-7C, 8A and 8B is a fire protection sprinkler having a releasing mechanism with a hook, strut, link and electrically operated actuator to control fluid discharge from the sprinkler. The link is a thermally insensitive link that maintains the hook and strut in a static arrangement to support a sealing assembly within the outlet of the sprinkler to prevent the fluid discharge. The link includes two portions which maintain the strut and the hook in their static arrangement. The hook and strut are separated by an intermediate portion of the link which forms a designed fracture region of the link and releasing mechanism. Operation of the electrically operated actuator separates the hook and the strut so that the link breaks in tension along the fracture region causing the releasing mechanism to collapse thereby releasing the sealing assembly and the discharge of fluid from the sprinkler. The link and its designed fracture region ensure that the link breaks at a desired location. The link includes properly sized openings in each of the first and second portions of the link to respectively engage or receive the hook and strut. Moreover, the intermediate portion of the link is configured in its geometry or material to ensure that its maximum tensile strength is less than the maximum tensile strength of either the first or second portions of the link. Because the intermediate portion is located between the first and second portion, the link of the releasing mechanism in WO2015/191619 is complex.

DISCLOSURE OF INVENTION

The present invention is directed to preferred embodiments of an electrically actuated fire protection sprinkler assembly and methods of its operation. A preferred sprinkler includes a frame, a deflector member, a sealing assembly, and a preferred releasing mechanism for a controlled actuation. The frame includes a body having an inlet and an outlet. A sealing assembly is disposed in the outlet to occlude the outlet and prevent the flow of the fluid through the passageway from the inlet to the outlet. The preferred releasing mechanism has an unactuated configuration that statically supports the sealing assembly in the outlet. Moreover, the preferred releasing mechanism has an actuated configuration that releases the sealing assembly from the outlet to permit the flow of the fluid through the passageway and discharge from the outlet. The releasing mechanism preferably includes a hook member, a strut member, a load member, a link member, and an actuator. In the preferred releasing mechanism, the link is preferably a thermally insensitive member that surrounds or frames the strut and hook members and holds the members in a static relationship of the unactuated configuration. A preferred link member includes a single central slot through which each of the hook member and the strut member extend. In addition, the preferred releasing mechanism includes a link member and actuator arrangement for separating the hook and strut members to break the link member upon operation of the actuator.

In preferred embodiments of the releasing mechanism, the link member includes a designed fracture region. One embodiment of the preferred link member includes a plurality of fracture regions and more preferably includes a pair of fracture regions formed along a midline of the link member. In the preferred embodiment of the link member having a single central slot, a pair of fracture regions are formed about the slot. In preferred embodiments of the releasing mechanism, the strut member is in contact with the first end portion of the hook member to define a contact region. An internal edge of the link member in contact with the strut member at a first distance from the contact region and the actuator is positioned at a second distance from the contact region that is greater than the first distance.

A preferred method of controlling operation of a sprinkler includes sealing the sprinkler with a hook and a strut assembly with a thermally insensitive link member having a central slot that frames the hook and the strut in a spaced relation and breaking the link member. Another preferred method of controlling operation of a sprinkler includes maintaining a sealing assembly within an outlet of the sprinkler with a static assembly of a hook member, strut member and link member and displacing the strut member with respect to the hook member by a linear actuation force from an end portion of the hook member.

BRIEF DESCRIPTION OF THE DRAWINGS

The accompanying drawings, which are incorporated herein and constitute part of this specification, illustrate exemplary embodiments of the invention, and, together with the general description given above and the detailed description and attachments given below, serve to explain the features of the invention.

FIG. 2 is a schematic cross-sectional side view of the sprinkler assembly of FIGS. 1A-1B with a controller in an actuated state.

DETAILED DESCRIPTION OF THE PREFERRED EMBODIMENTS

Figure 1A:
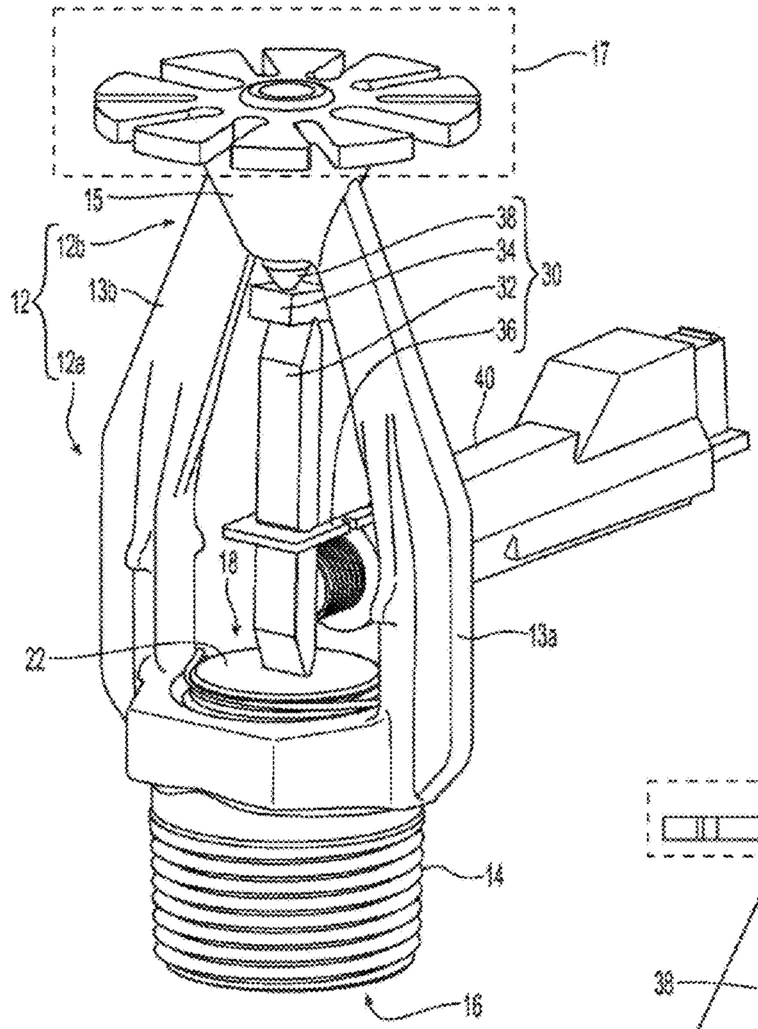
FIGS. 1A-1B are perspective and side views of a preferred sprinkler assembly
Figure 1B:
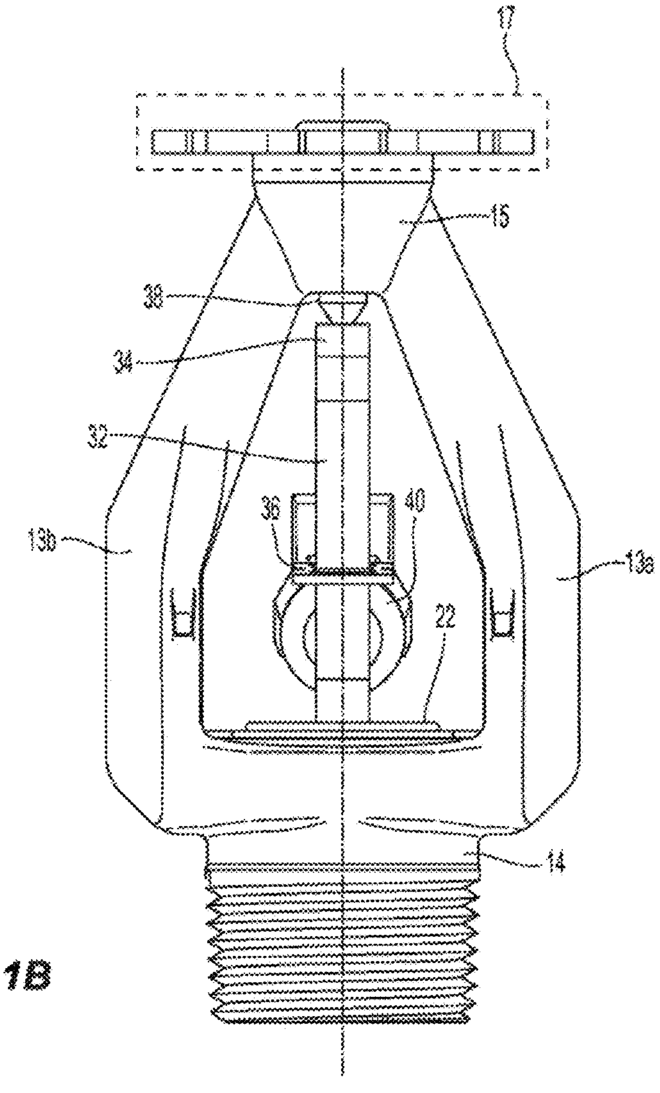

Shown in FIGS. 1A, 1B and IC are respective perspective, side and cross-sectional views of one embodiment of a fire protection sprinkler assembly 10 in an unactuated state. The sprinkler 10 includes a sprinkler frame 12 having a first end 12*a* and a second end 12*b*. At the first end 12*a* of the frame 12 is a body 14 having an inlet 16 and an outlet 18 with an internal passageway 20 extending between the inlet 16 and the outlet 18 along a sprinkler axis A-A. The frame preferably includes a pair of frame arms 13*a*, 13*b* disposed about the body 14 extending from the outlet 18 to the second end 12*b* of the frame 12 and converging toward an apex 15 axially aligned along the longitudinal axis A-A. Affixed to the apex 15 is a fluid deflecting member 17 which is shown generically and spaced from the outlet 18 to be impacted by a discharge of firefighting fluid from the outlet 18. It should be understood that the frame arms 13*a*, 13*b* and apex 15 can individually or collectively define different profiles or geometries than those specifically shown so long as it supports the deflecting member 17 in a spaced relationship from the outlet 18 to distribute the fluid discharge. The deflecting member 17 can be any type of deflector, e.g., oriented as a pendent or upright deflector, for generating a desired spray pattern provided the deflector 17 can be affixed to the second end 12*b* of the frame 12 in use with the operational components described herein.

The first end 12*a* of the frame 12 and its inlet 16 are configured for connection to a supply of firefighting fluid such as, for example, water. Accordingly, the frame 12 preferably includes an external thread such as an appropriate standard pipe thread, for example National Pipe Thread (NPT), for connection to a pipe line of water. Alternatively the frame can include another appropriate mechanical connection or fitting for joining to a pipe, such as for example an alternate thread or fitting for a welded connection. In the unactuated state of the sprinkler 10, the outlet 18 is occluded or sealed by a sealing assembly 22 to control discharge of the supplied firefighting fluid from the outlet 18 of the sprinkler 10. The sealing assembly 22 generally includes a sealing button, body or plug 22*a* disposed within the outlet 18 and coupled to or engaged with a biasing member 22*b* such as, for example, a Belleville spring and/or other resilient member which acts to bias the button 22*a* out of the outlet 18.

Figure 1C:
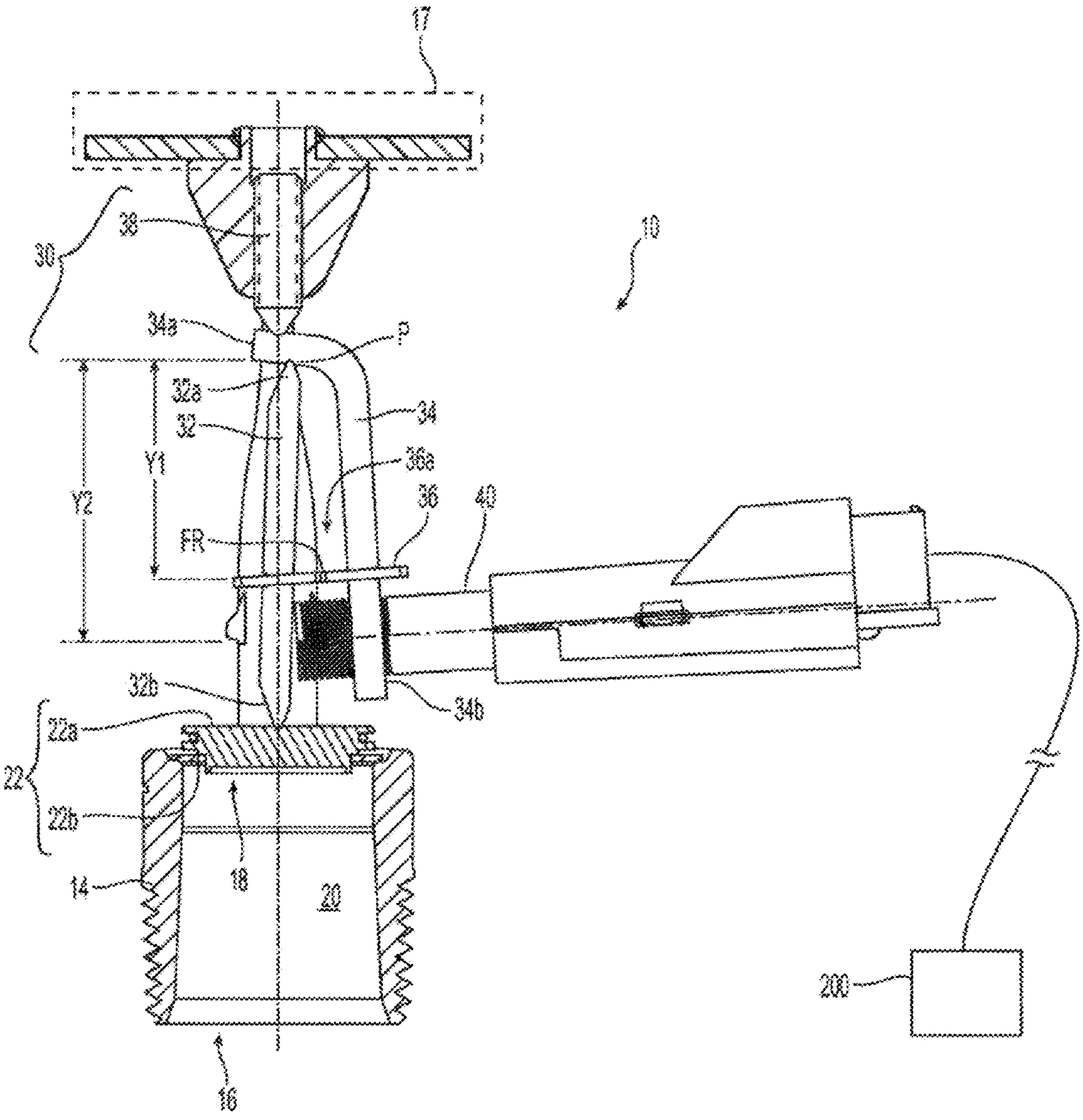
FIG. 1C is a schematic cross-sectional side view of the sprinkler assembly of FIGS. 1A-1B with a controller in an unactuated state.
Figure 2:
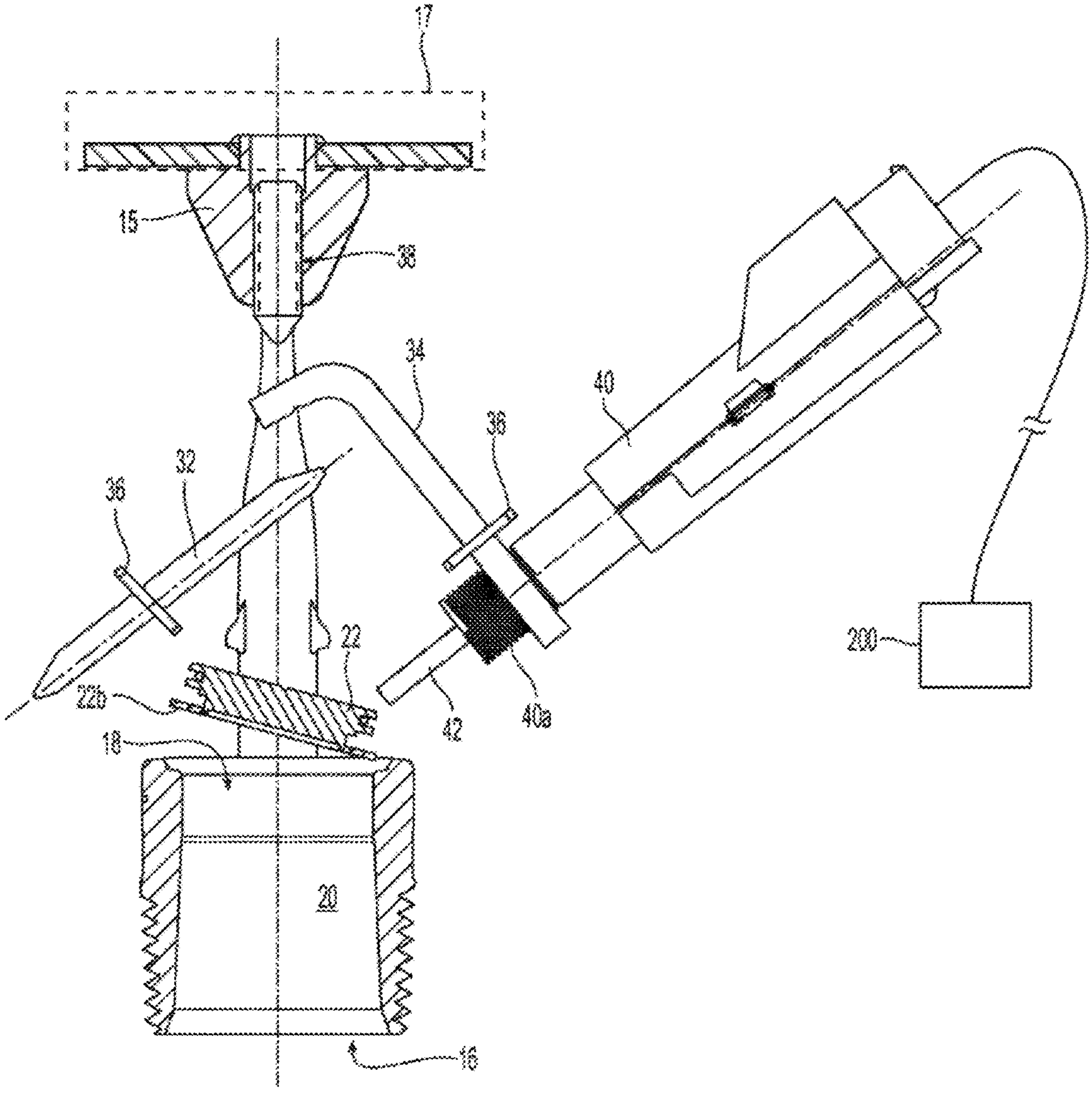
FIG. 2 is a first section view of a manual reset actuator, according to an example implementation.

Actuation of the sprinkler assembly 10 is not directly triggered or operated by a thermal or heat-activated response. Instead, the operation of the sprinkler 10 is preferably electrically controlled, for example, by a controller 200 in communication with the sprinkler 10 or other signal generating device. FIGS. 1C and 2 show a schematic view of the sprinkler 10 in a preferred system installation and operation. Supporting the sealing assembly 22 within the outlet 18 is a preferred electrically operated trigger assembly or releasing mechanism 30. The releasing mechanism 30 defines a first unactuated configuration or arrangement, as seen in FIG. 1C, to maintain the sealing assembly 22 within the outlet 18. The releasing mechanism 30 has a second configuration or state, as seen in FIG. 2, in which the releasing mechanism 30 and its actuator 40 is electrically operated or otherwise signaled to release the sealing assembly 22 and permit ejection of the sealing assembly 22 from the outlet 18 and discharge of the firefighting fluid from the outlet 18.

In a preferred embodiment, the releasing mechanism 30 includes a strut member 32, a lever or hook member 34, a link member 36, a load member 38, and an actuator 40. As seen in the first configuration of FIG. 1C, the strut member 32 contacts or engages the hook member at a contact region P. The link member 36 is a preferably thermally insensitive link member positioned at a first axial distance Y1 from the contact region P to hold the strut and hook members 32, 34 in a preferred static arrangement between the load member 38 and the sealing assembly 22. The load member 38 is preferably embodied as a screw or other threaded member 38 forming a preferably threaded engagement with the second end 12*b* of the frame 12 and internally threaded apex 15 to apply a load axially aligned with the longitudinal axis A-A. The assembled hook, strut and link arrangement 32, 34, 36 transfers the axial load of the screw 38 to the sealing assembly 22 to keep the assembly seated against an internally formed sealing seat at the outlet 18 of the frame body 14. When installed with fluid delivered to the inlet 16, the hook member 34 can sustain a preferred hook load in a direction perpendicular to the window of the frame arms that ranges from 9-15 pounds of force (lbs.).

The preferred releasing mechanism 30 provides for a preferred arrangement of link member 36 and actuator 40, which in the second or actuated configuration, efficiently and reliably breaks the link member 36 and more preferably breaks the link member along a designed fracture region FR of the link member. More specifically, the actuator 40 is positioned at a second axial distance Y2 with respect to the contact region P that is greater than the first axial distance Y1. By locating the actuator 40 further out or below the link member 36 relative to the contact region P, a preferred linearly directed force of the actuator 40 operates with greater mechanical advantage over the link member 36. Moreover, the relative positioning of the actuator 40 and the link member 36 effectively maximizes the transmission of the force and energy from the actuator 40 to the link member 36. The transmission of energy fractures the link member 36 along the fracture region FR thereby decoupling the strut and hook members 32, 34 to release the sealing assembly 22 as schematically depicted in FIG. 2.

Referring again to the preferred embodiment of the releasing mechanism 30 in FIGS. IA-IC, the hook member 34 is a preferably elongate bent member having a first end portion 34*a* and a second end portion 34*b*. The strut member 32 is a preferably linear member having a first end 32*a* in contact with the first end portion 34*a* of the hook member 34 at a location offset from the longitudinal axis A-A to define the preferred contact region P. The preferred screw member 38 contacts and applies its load to the first end portion 34*a* of the hook member 34 at a location preferably off set and opposite the contact region P of the strut member 32. The second end 32*b* of the strut member 32 is in contact with the sealing assembly 22 at a location along the longitudinal axis A-A. The preferred link member 36 surrounds or frames the strut and hook members 32, 34 in a spaced apart relationship. In a preferred embodiment, the preferred link member 36 includes internal edges defining a centralized slot 36*a* through which the strut and hook members 32, 34 extend and are held in spaced apart static relation under the load of the screw member 38. More specifically, the hook member 34 and the strut member 32 respectively contact and preferably frictionally engage opposed internal edges of the link 36 to locate the link member 36 at the first axial distance YI from the contact region P and form the preferred strut, hook and link arrangement for transmitting the load from the screw member 38 to the sealing assembly 22 as previously described.

The actuator 40 is located proximate the second end portion 34*b* of the hook member 34 and the second end 32*b* of the strut member 32. In the preferred embodiment, the actuator 40 is preferably coupled to the second end portion 34*b* of the hook member 34 and with its operational end 40*a* preferably placed in contact with the strut member 32 in the unactuated state of the trigger assembly 30 at the preferred location axially below the link member 36 between the link member 36 and the second end 32*b* of the strut member 32 at the preferred axial distance Y2 from the contact region P. Upon actuation, the actuator 40 applies a force on the strut member to separate the hook and strut members. The separation or spreading apart of the strut and hook members, loads and breaks the link member 36 along the preferred fracture region FR as described. Alternatively, the actuator 40 can be coupled to the strut member 32 to act upon the hook member 34. Moreover, the actuator 40 can be disposed between and proximate the second ends of the hook and strut members provided the operating force of the actuator separates the hook and strut members as described.

Referring to FIG. 2, upon delivery of an appropriate electric actuating signal to the actuator 40, a piston 42 extends from the operational end 40*a* of the actuator which acts against the strut member 32 which separates the hook and strut member and generates a moment about the contact region P with the hook or lever member 34. The resulting moment transmits a tensile force in the link member 36. As the applied tensile force exceeds the maximum tensile capacity of the link member 36, the link member 36 fails along the preferred fracture region FR permitting the hook member 34 to pivot about the first end 32*a* of the strut member 32. The releasing mechanism 30 then collapses allowing the sealing assembly 22 to be released from the outlet 18. That is, the releasing mechanism 30 transitions from the first configuration (or unactuated state) to the second configuration (or actuated state). FIG. 2 is a schematic depiction of the collapse and thus, the particular manner in which the strut, hook and link members fall from the sprinkler frame 12 may vary, for example, falling to the same side of the frame arms 13*a*, 13*b*. Subsequently, water delivered to the frame body is allowed to be discharged from the outlet 18 to impact the deflecting member 17 for distribution in a desired manner.

The actuator 40 can be one of various types of actuators such as, for example, a pyrotechnic actuator or a solenoid actuator. Preferably, the actuator 40 is a pyrotechnic actuator such as Metron Protractor™ made by Chemring Energetics UK Ltd, e.g., DR2005/Cl Metron Protractor™. The Metron™ actuator (or Metron™ protractor) is a pyrotechnic actuator that utilizes a small explosive charge to drive a piston. This device is designed to create mechanical work through fast movement when the piston is driven by the combustion of a small quantity of explosive material. To operate the preferred Metron actuator 40, a device is coupled to the actuator 40 that is capable of generating an appropriate electric impulse signal to ignite a fusehead of the actuator and its pyrotechnic. For example, the actuator 400 may communicate with an appropriate controller 200, as schematically shown in FIGS. 1C and 1D, through one or more lines or through a suitable communication interface such as, for example, telephone, wireless digital communication or via an Internet connection. Upon receiving an appropriate control or command signal from the controller 200, the actuator 40 operates and applies a force on the strut 32 in a manner as previously described to actuate the sprinkler 10.

Figure 3A:
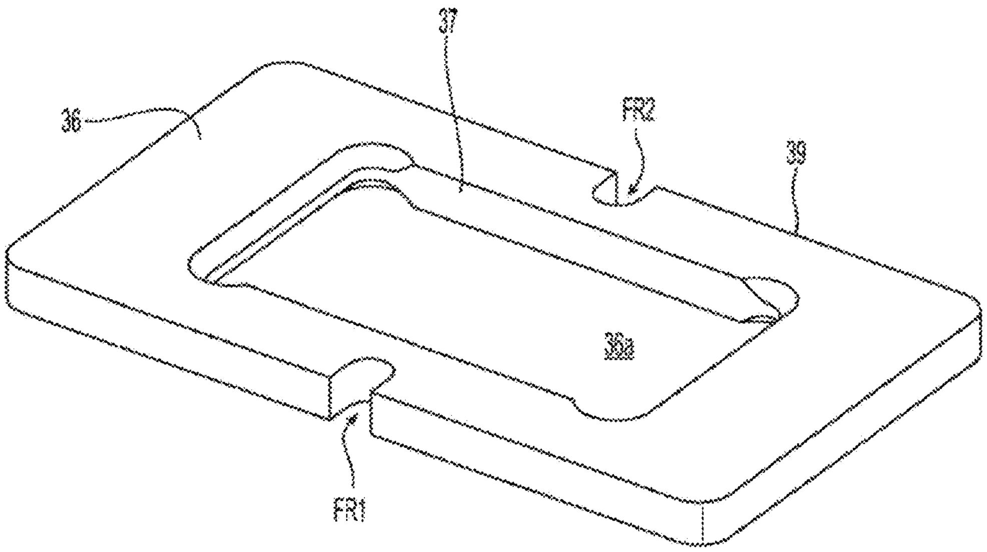
FIGS. 3A-3C are various views of a preferred link member for use in the sprinkler assembly of FIGS. 1A-1B.
Figure 3B:
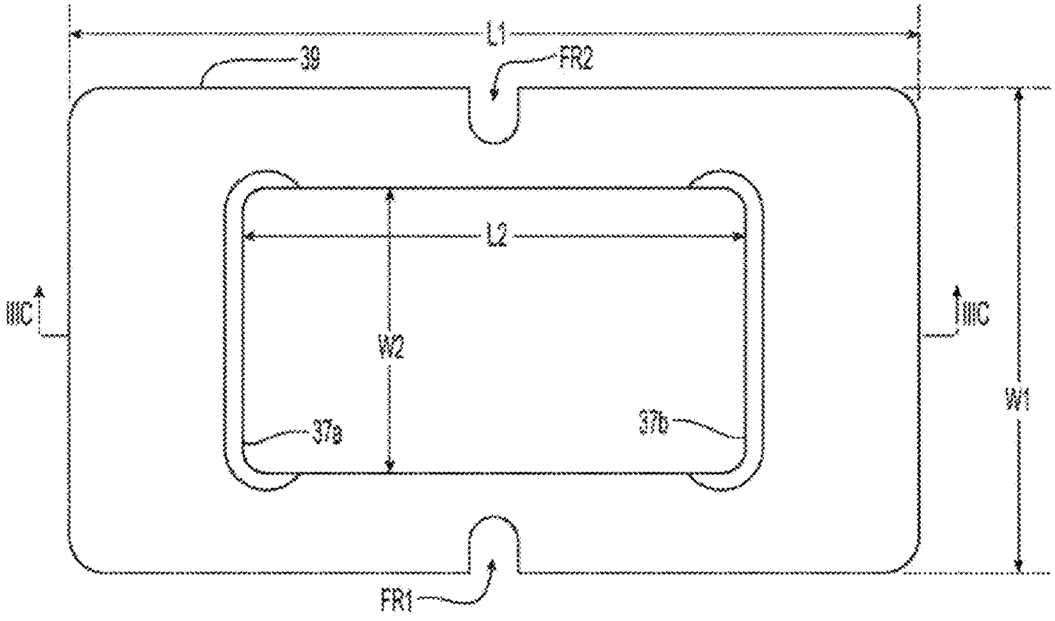
Figure 3C:
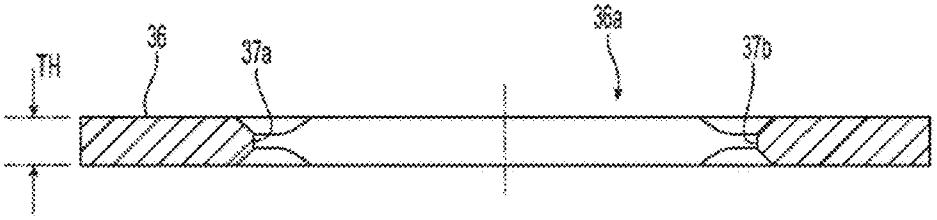

Shown in FIGS. 3A-3C are various views of a the preferred link member for use in the releasing mechanism 30. As shown, the preferred link member 36 is a preferably rectangular member having a closed form internal edge 37 defining the preferred single centralized slot 36*a* for receipt of the hook and strut members 34, 32 with an outer peripheral edge 39 surrounding the central slot. The preferred link member 36 has a substantially rectangular outer peripheral edge 39 having a length LI ranging from 0.5 inch to 0.75 inch and is more preferably 0.7 inch. The peripheral edge 39 has a preferred width WI ranging from 0.3 inch to 0.5 inch and is more preferably 0.4 inch. The internal edge 37 defines a preferably rectangular central slot having a preferred length L2 ranging from 0.3 inch to 0.5 inch and is more preferably about 0.4 inch. Moreover, the preferred internal edge defines the width W2 of the central slot which preferably ranges from 0.2-0.25 inch and is more preferably about 0.23-0.24 inch. The link member is preferably made from copper material and has a preferably constant thickness Th which preferably ranges from 0.03 inch to 0.04 inch and is preferably about 0.4 inch. As previously described, opposed internal edges of the link member 36 engage the strut and hook members 32, 34 in the unactuated state of the releasing assembly. The opposed short internal edges 37*a* of the link member 36 are preferably configured for engaging the strut and hook members 32, 34. The opposed edges are preferably chamfered on each side of the link member, for example, to a chamfer of (0.01-0.02 in.)×(30°-60°).

The preferred link member 36 has a designed fracture region FR. In the preferred link member 36, the fracture region FR can include multiple fracture regions and more preferably includes a pair of fracture regions FRI, FR2 formed about the central slot 36*a*. The fracture regions are notches or recesses formed along the peripheral edges 39 of the parallel elongate portions of the preferably rectangular link member 36, which provide a design area of reduced strength for failing or fracturing under tensile load. Moreover, the fracture regions FRI, FR2 are preferably located along the midline between the opposed internal edges 37*a*. 37*b* of the link member. Accordingly when the link member 36 fractures, both fracture regions FRI, FR2 preferably fail and the link preferably splits into two equal pieces. Alternatively, only one fracture region provided the fracture link member permits the releasing mechanism to collapse for operation of the sprinkler. The peripheral edge 39 and the internal edge 37 are spaced apart to define a maximum width of the elongate portion of the link member 36. The notches 35*a*, 35*b* preferably extend from the peripheral edge 39 toward the internal edge 37 to a notch depth which reduces the maximum width by over 50%. Generally, the notches 35*a*, 35*b* are formed as slots extending inward from the peripheral edge 39 preferably terminating at a radiused end. In the preferred link member 36 has a width of 0.4 inch, the central slot 36*a* has a width of about 0.23 inch to define a maximum width of 0.08 inch in each elongate portion of the link member 36. The notches 35*a*, 35*b* preferably extend to a notch depth of 0.04-0.05 inch to define a preferred reduced width of 0.036 inch in each elongate portion.

The preferred link member 36 and its fracture regions FR1, FR2 define the load capacity of the link member 36. In a preferred configuration, the link member 36 can sustain a yield load of over 90 lbs. and a tensile load of less than 125 lbs. when subject to a tensile force applied at a rate of 0.05 inches per minute applied to the opposed internal edges 37*a*, 37*b* about the pair of fracturing notches 35*a*, 35*b*. The fracture regions FR may be alternatively formed so long as it provides an area in the link member 36 that is designed to fail under a tensile load applied in a manner as described herein. For example, instead of forming notches as described, the elongated portions of the link can include a region of reduced or tapered width or use a dissimilar, weaker material.

FIGS. 4A-4C and 5A-5B show detailed views of the preferred hook and strut members 34, 32. Each of the members define preferred dimensions and surfaces having recesses, notches and or grooves for locating, engaging, coupling, or frictionally engaging other components of the releasing mechanism 30 in a manner as described herein. For example, the preferred hook member 34 in FIG. 4B and the preferred strut member 32 in FIG. 5A define preferred widths ranging from 0.210 inch to 0.22 inch and preferably about 0.215 inch for insertion within the central slots 36*a* of the preferred link member 36.

The preferred hook member 34 has a first or outer surface 33*a* and a second or inner surface 33*b* which are preferably spaced apart at a constant distance over the length of the preferred hook member 34 to define a preferred constant thickness TK1 of over 0.1 inch to about 0.125 inch. Additionally or alternatively, the hook member 34 is preferably made from a preferred Monel alloy material and the thickness of the hook member 34 is preferably dimensioned to have sufficient strength in the operation of the releasing mechanism 30. For the hook member 34, the first surface also defines a preferred bend angle α defined as the included angle between the first surface 33*a* of the first end portion 34*a* and the first surface 33*a* of the second end portion 34*b*. The included angle preferably ranges from 75° to 85° and more preferably ranges from 79° to 81°. The preferred strut member 32 is preferably made from similar material as the hook member and has a variable thickness TK2 between its first or outer surface 31*a* and second or inner surface 31*b* such that the strut member tapers at its ends 32*a*, 32*b*.

Figure 4A:
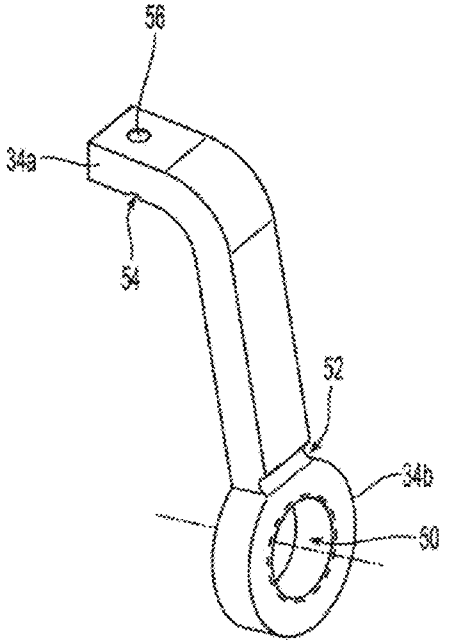
FIGS. 4A-4C are various views of a preferred hook member for use in the sprinkler assembly of FIGS. 1A-1B.
Figure 4B:
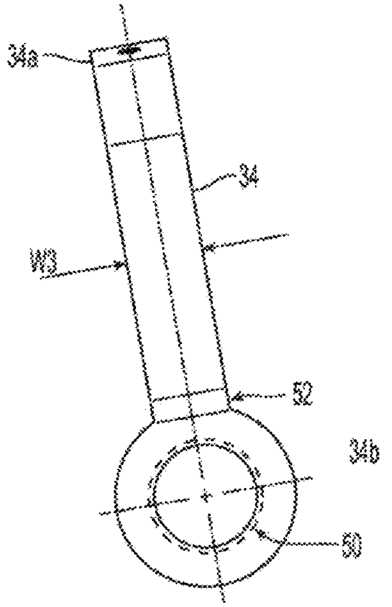
Figure 4C:
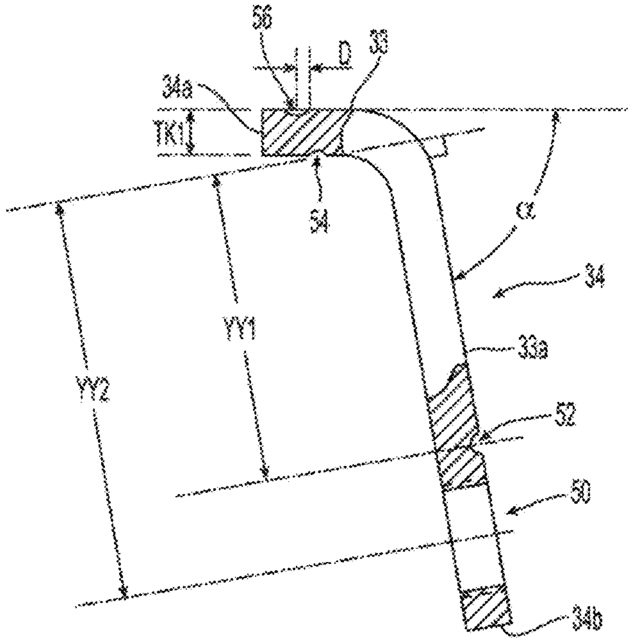

Referring again to the hook member 34 of FIGS. 4A-4C, the second end portion 34*b* is preferably formed to engage and retain the actuator 40. As shown, the second end portion 34*b* is preferably annular having a circular internally threaded opening 50 for a preferred threaded engagement with the operational end 40*a* of the actuator 40. Because the actuator 40 is mounted on the hook member 34, there is no requirement for separate mounting to the sprinkler frame 12 for installation of the actuator 40. Thus, when the releasing mechanism 30 is operated, the actuator 40 is ejected away with the hook member 34 from the sprinkler frame 12 as depicted in FIG. 2. Thus, there is no obstruction (or disruption) in the waterway due to the actuator 40.

Each of the first and second surfaces 33*a*, and 33*b* include recesses or notches to locate, contact and preferably frictionally engage the strut, link and load members. At the second end 34*b* of the hook member adjacent the annular formation is a preferred linear recess or radiused notch 52 formed across the first surface 33*a* as a mounting location to frictionally engage the inner surface 37*b* of the link member 36. At the first end 34*a* of the hook member along the second surface 33*b* is a another linear recess or radiused notch 54 for forming the preferred contact region P previously described for frictionally engaging the first end 32*a* of the strut member 32. Each of the circular opening 50 and adjacent recess 52 are located relative to the linear recess 54 at respective distances YY1 and YY2 to locate the link member 36 and actuator 40 relative to the contact region Pin the preferred manner previously described. The distances YY1 and YY2 preferably respectively measure about 0.875 inch and 1 inch and more preferably about 0.85 inch and 1.1 inch respectively. At the first end 34*a* of the hook member along the first surface 33*a*, a preferably partial spherical recess 56 is formed for frictional engagement with the end of the load screw 38. The spherical recess 56 is preferably offset from the opposed linear recess 54 at preferred offset distance D of 0.5-0.7 inch and more preferably 0.6 inch.

Figure 5A:
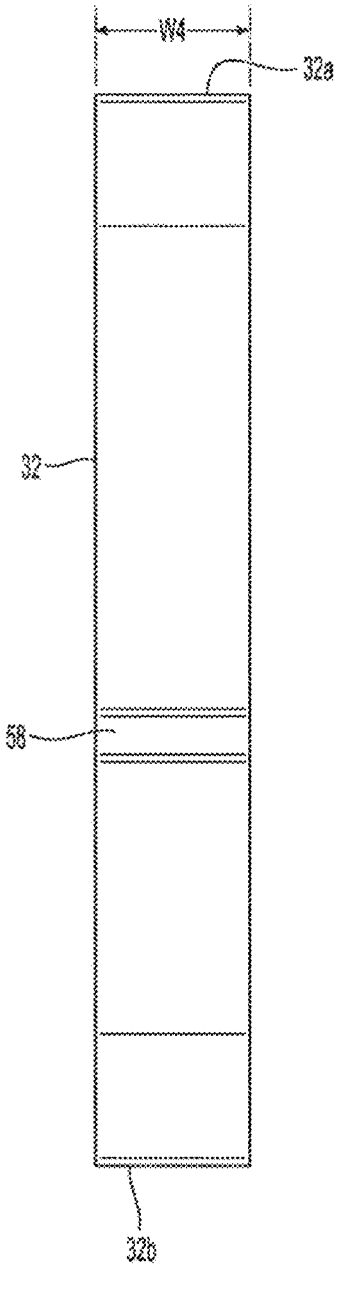
FIGS. 5A-5B are various views of a preferred strut member for use in the sprinkler assembly of FIGS. 1A-1B.
Figure 5B:
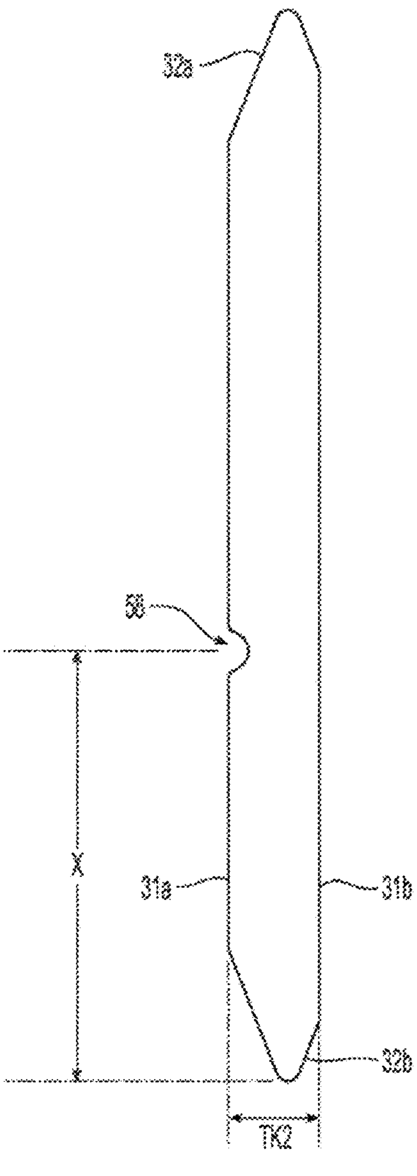

Referring again to the strut member 32 in FIGS. 5A and 5B, the first surface 31*a* of the strut member includes a linear recess or radiused notch 58 for frictionally engaging the internal edge 37*a* of the link member 36. The recess 58 is preferably located at a distance X of 0.6 inches from the second end 32*b* of the strut to locate the link member 36 in a preferred manner as previously described. With the recesses 52, 58 locating and orienting the link member 36 along the strut and hook members as shown and described, the single central slot 36*a* helps ensure that the actuator 40 can be threaded into the annular opening 50 of the hook member and brought into contact with the strut member 32 in the unactuated state of the releasing mechanism 30 and preferably with the actuator resting against the strut member 32 with zero load applied to the strut member. This can assure full or maximized transmission of the actuation energy from the actuator 40 to the link member 36 upon actuation to maximize the efficiency and reliability in fracture of the link member as described.

The preferred releasing mechanisms described provide methods for controlling operation of a sprinkler. The method includes maintaining a sealing assembly within an outlet of the sprinkler with a static assembly of a hook member, strut member and thermally insensitive link member. To operate the sprinkler, the strut member is displaced with respect to the hook member by a preferably linear actuation force delivered from an end portion of the hook member. In another preferred method the sprinkler is sealed with a hook and strut assembly. In the assembly with a preferred link member that surrounds the hook and strut. The link member is then broken to displace the seal. The link member is preferably broken along a designed fracture region in the actuated state.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

The invention claimed is:

1. A sprinkler releasing mechanism, comprising:
- a hook member having a first end portion and a second end portion, the second end portion comprising a through opening;
- a strut member having a first end and a second end, the first end of the strut member in contact with the first end portion of the hook member;
- a link member having a fracture region and a central slot, the strut member and the hook member extending through the central slot; and
- an actuator to separate the hook member and the strut member to break the link member along the fracture region, the actuator coupled with the hook member via the through opening, the through opening disposed axially between the link member and the second end of the strut member.

2. The sprinkler releasing mechanism of claim 1, comprising:
- the sprinkler releasing mechanism to couple with a sprinkler in an unactuated state to support a body of the sprinkler.

3. The sprinkler releasing mechanism of claim 1, comprising:
- the second end of the strut member in contact with a body of a sprinkler.

4. The sprinkler releasing mechanism of claim 1, comprising:
- the fracture region extending from an outer peripheral edge of the link member toward the central slot.

5. The sprinkler releasing mechanism of claim 1, comprising:

the actuator including a piston to separate the hook member and the strut member.

6. The sprinkler releasing mechanism of claim 1, comprising:

the fracture region comprising a first notch and a second notch, the first notch and the second notch disposed on opposite sides of the link member.

7. The sprinkler releasing mechanism of claim 1, comprising:

a first notch of the fracture region disposed on a first side of the link member; and a second notch of the fracture region disposed on a second side of the link member.

8. The sprinkler releasing mechanism of claim 1, comprising:

the fracture region including a notch.

9. The sprinkler releasing mechanism of claim 1, comprising:

the strut member including a notch;

the hook member including a notch; and the notch of the strut member and the notch of the hook member each configured to frictionally engage the link member.

10. The sprinkler releasing mechanism of claim 1, comprising:

the actuator configured to push the second end of the strut away from the second end portion of the hook member to break the link member at the fracture region.

11. The sprinkler releasing mechanism of claim 1, comprising:

the hook member including a notch at which the link member contacts the hook member.

12. The sprinkler releasing mechanism of claim 1, comprising:

the sprinkler releasing mechanism included in a sprinkler; and at least a portion of the fracture region configured to fracture in an actuated state of the releasing mechanism.

13. The sprinkler releasing mechanism of claim 1, comprising:

the fracture region extending from an outer peripheral edge of the link member toward the central slot; and the fracture region formed along the outer peripheral edge of the link member.

14. The sprinkler releasing mechanism of claim 1, comprising:

opposed internal edges of the link member including chamfered edges.

15. The sprinkler releasing mechanism of claim 1, comprising:

the hook member defining a bend angle of 79°-81°.

16. The sprinkler releasing mechanism of claim 1, comprising:

the actuator including at least one of a solenoid actuator or a Metron actuator; and the actuator communicably coupled with a controller.

17. The sprinkler releasing mechanism of claim 1, comprising:

the actuator having an operational end to extend through the through opening of the second end portion of the hook to contact the strut member.

18. A method, comprising:

supporting a body in a closed position via a releasing mechanism, the body disposed at a first end of a frame of a sprinkler, the frame comprising the first end and a second end spaced apart along a longitudinal axis, the releasing mechanism having an unactuated state to support the body and an actuated state to release support from the body, the releasing mechanism comprising:

a hook member having a first end portion and a second end portion, the second end portion comprising a through opening;

a strut member having a first end and a second end, the first end of the strut member in contact with the first end portion of the hook member;

a link member having a fracture region and a central slot, the strut member and the hook member extending through the central slot; and an actuator configured to separate the hook member and strut member in the actuated state of the releasing mechanism, the actuator coupled with the hook member via the through opening, the through opening disposed axially between the link member and the second end of the strut member; and the actuator configured to contact the strut member of the releasing mechanism to cause the link member of the releasing mechanism to break at the fracture region by pushing the strut member away from the hook member of the releasing mechanism, the fracture region extending from an outer peripheral edge of the link member toward the central slot.

19. The method of claim 18, comprising:

locating the actuator at a distance from a contact region between the strut member and the hook member that is greater than a distance between the link member and the contact region.

20. The method of claim 18, comprising:

coupling the actuator with the hook member and disposing the end of the actuator on the strut member in the unactuated state of the releasing mechanism.

* * * * *